United States Patent [19]

Koether

[11] 4,077,690
[45] Mar. 7, 1978

[54] SAFETY DEVICE FOR ELECTRICALLY AND MECHANICALLY COUPLING A TEMPERATURE-SENSING PROBE TO A TIMING COMPUTER

[75] Inventor: Bernard G. Koether, Westport, Conn.

[73] Assignee: Food Automation-Service Techniques, Inc., Stratford, Conn.

[21] Appl. No.: 726,850

[22] Filed: Sep. 27, 1976

[51] Int. Cl.² .................. G01K 7/22; H01R 13/54
[52] U.S. Cl. .................. 339/89 R; 73/362 AR; 99/328; 339/DIG. 1
[58] Field of Search .............. 339/DIG. 1, 89 R; 73/353, 362 AR; 219/523; 99/325, 328, 331, 333

[56] References Cited

U.S. PATENT DOCUMENTS

| | | | |
|---|---|---|---|
| 3,241,370 | 3/1966 | Mertler et al. | 73/352 |
| 3,866,472 | 2/1975 | Witt | 73/362 AR |

Primary Examiner—Joseph H. McGlynn
Assistant Examiner—E. F. Desmond
Attorney, Agent, or Firm—Wooster, Davis & Cifelli

[57] ABSTRACT

A probe safety coupling device adapted for use in a cooking system, such as in the deep fat frying of French fries, fish, chicken and the like, wherein the cooking is to be controlled by an electrical control unit responsive to the temperature of a predetermined portion of the cooking medium as sensed by a probe assembly containing a temperature-sensitive element at one end and delivering electrical signals to the control unit through a flexible conduit at the other end. The probe assembly is attached to the control unit with good electrical contact and with lessened risk of probe breakage by means of a safety coupling device which includes a first electrical connector fixedly secured to the timing computer and joined to a length of flexible conduit terminating in a second electrical connector. The second electrical connector joins the safety coupling device to the probe assembly so that their respective flexible portions have their longitudinal axes in alignment, and is arranged to be axially releasable, preferably being of the pin and socket type with the pins and sockets extending axially and releasing from one another upon the imposition of sufficient axial tension. Because of the flexibility of the probe assembly and coupling device, minimal bending stress is placed upon the electrical connection therebetween, thus maintaining reliable electrical contact. Relative movement between the control unit and probe assembly, arising for example from a failure to remember to disconnect the probe during nightly cleaning, is converted to an axial disconnecting stress automatically separating the probe assembly from the safety coupling without breakage.

9 Claims, 3 Drawing Figures

SAFETY DEVICE FOR ELECTRICALLY AND MECHANICALLY COUPLING A TEMPERATURE-SENSING PROBE TO A TIMING COMPUTER

BACKGROUND OF THE INVENTION

1. Field of the Invention

The present invention relates to cooking systems, such as are used in deep fat frying, using electrical control units. It is especially applicable where a temperature-sensitive probe assembly supplies temperature data to a cooking timing computer for calculation of the appropriate length of cooking cycle based on the sensed temperature and variations in temperature or to some other unit utilizing signals from a temperature-sensitive probe. The probe assembly contains a temperature-sensitive element, such as a thermistor, which delivers electrical signals corresponding to the sensed temperature through electrical leads to the timing computer.

2. Description of the Prior Art

In cooking systems using temperature-sensitive probes and timing computers, it generally is necessary to periodically clean the probes and, over much longer periods, to replace them. Accordingly, the probe assembly and timing computer are made so as to be disconnectible electrically and mechanically from one another.

The connector used to join the probe assembly to the timing computer, however, must maintain good electrical contact if a correct temperature data input is to be supplied to the computer. The temperature-sensitive element in the probe varies its resistance of electrical output with temperature, and any additional resistance arising from poor electrical contact in a connector will alter the calculated cooking time. For example, if poor electrical contact results in a one degree variation in the temperature data input to the computer, and the product being cooked is an average 10 pound load of chicken where the total temperature drop of the cooking medium may be only 10° during the 10 to 15 minute cooking period, the one degree variation in temperature measurement can result in as much as a 10 percent variation of cooking time.

To provide the desired good electrical contact, mating pin and socket connectors held in alignment by mechanically fastening them with a threaded ring are commonly used. Unfortunately, however, there are times when, in removing a probe for cleaning, a worker forgets to mechanically unfasten the connector and, in moving the probe assembly relative to the timing computer, strains or breaks the probe. Known probe connecting arrangements heretofore have been unable to both provide good electrical contact and minimize risks of breakage.

SUMMARY OF THE INVENTION

A principal object of the present invention is to provide an improved coupling for attaching a probe assembly supplying temperature data to an electrical cooking control in a cooking environment. The control can be a timing computer, cooking temperature comparator, a unit adapted to program cooking based upon temperature, or the like. It is a specific object of the invention to provide a probe coupling device which maintains good electrical contact, and thus accurately supplies temperature data to the control unit, yet minimizes the risk of probe breakage. Still another object of the invention is to provide a probe safety coupling device which is compatible with existing systems and can be inexpensively added to present equipment.

In one embodiment of the invention to be described hereinbelow in detail, the probe safety coupling device for coupling a probe assembly to the control unit is shown in use with a timing computer which is used with a probe assembly of the type containing a temperature-sensitive element at one end and delivering electrical signals to the timing computer through a flexible conduit at the other end. The coupling device is of short length, inserted between the normal connection between the probe and the timing computer. It comprises a first electrical connector which is fixedly secured to the timing computer to insure good electrical contact. A flexible conduit joins the first electrical connector to a second electrical connector which joins with the probe assembly. The second electrical connector joins the flexible conduits of the probe and coupling device with their longitudinal axes in alignment, and is arranged to be axially releasable when an axial tension is placed on the connector through the flexible conduits. The second electrical connector preferably is of the pin and socket type with the pins and sockets aligned axially so as to separate from one another when sufficient axial tension is imposed. The second connector may also be other forms of frictionally-engaged, but axially-releasable units, such as interleaved blades. The foregoing arrangement is advantageous because the flexibility of the coupling device and of the probe minimize bending stresses upon the second connector to maintain reliable electrical contact. At the same time, relative movement between the probe assembly and timing computer is converted into an axial stress at the second connector permitting it to self disconnect without breakage either to the probe or the coupling. The first and second connectors of the safety coupling device may be of the same type as heretofore have been used in connecting a probe assembly to a timing computer, and thus the coupling device may be inexpensively added without modification to existing equipment.

Further objects, advantages and aspects of the invention will be pointed out in, or apparent from, the detailed description hereinbelow, considered together with the following drawings.

DESCRIPTION OF THE PREFERRED EMBODIMENT

Figure 1:
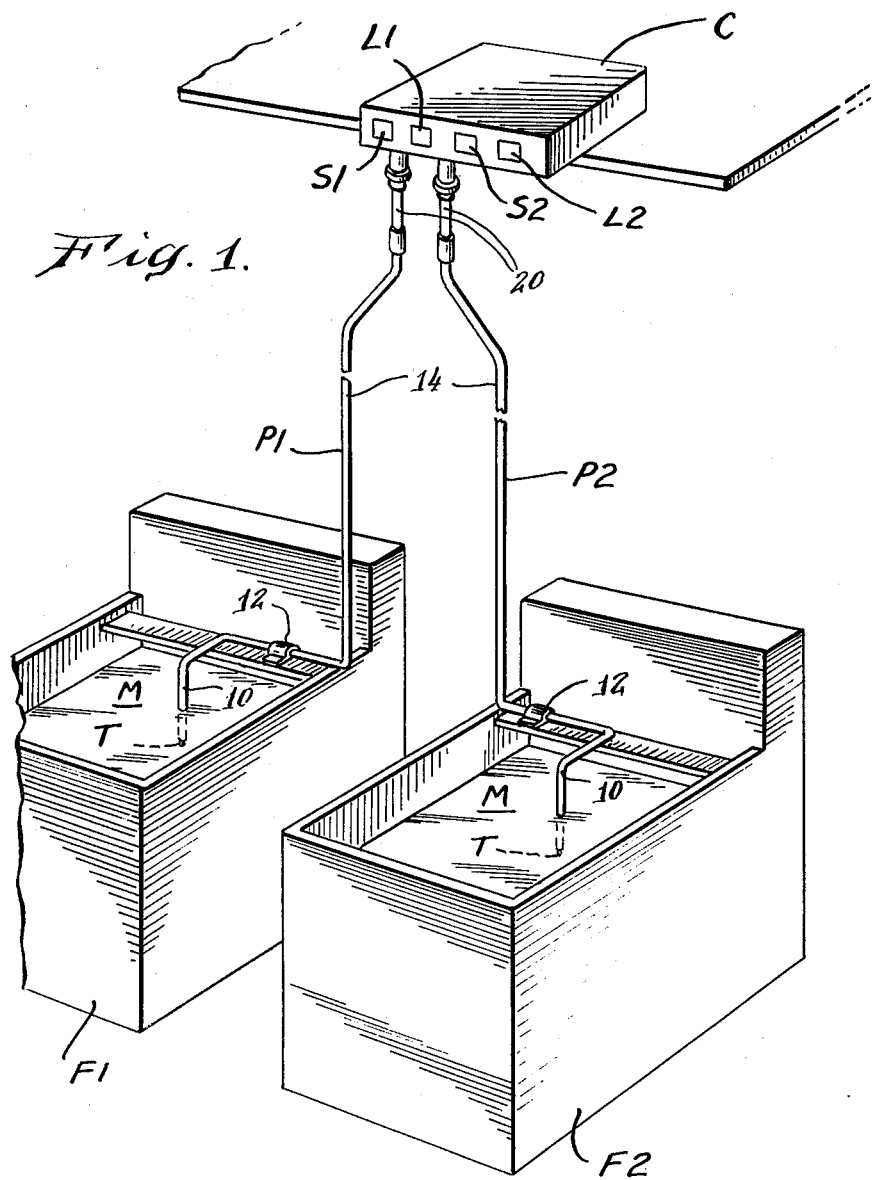
FIG. 1 is a perspective view, essentially schematic, showing a pair of deep fat fryers arranged to be governed by a timing computer with a temperature data input being supplied by a pair of probe assemblies coupled thereto in accordance with the present invention.

Referring first to FIG. 1, a pair of typical deep fat fryers F1 and F2 are shown serviced by a cooking timing computer C having start buttons S1 and S2 for starting the timing of cooking cycles, and indicator lights L1 and L2 for indicating when the cycles are over. Cooking timing computer C is preferably of the well known type which continuously monitors the temperature of a cooking medium M in the fryers as the temperature varies during a cooking cycle, and mathematically processes the temperature input data so as to integrate the temperature with respect to time to calculate when the desired degree of doneness is obtained.

As shown in FIG. 1, timing computer C monitors the temperature of the cooking medium in fryers F1 and F2 by means of probes P1 and P2 preferably similar to the type described in U.S. Pat. No. 3,866,472, comprising a stainless steel sleeve 10 attached to a fryer with a mount 12, containing a temperature-sensing element T at its lower end, and connecting to a flexible conduit 14 containing electrical leads for delivering electrical signals varying with temperature to the computer C. The mount 12 may be a clamp as shown, or a snap-in, snap-out mounting apparatus of the type disclosed in U.S. Pat. No. 3,950,632, to Rivelli. The probe flexible conduit 14 may be a small diameter stainless steel tubular shell, as disclosed in U.S. Pat. No. 3,866,472. Alternatively, in order to provide maximum flexibility without sacrificing the probe's overall imperviousness to oil and grease and easy cleanability, the probe may form the flexible conduit 14 with a flexible stainless steel spiral cable 16, such as the cable manufactured by Waterbury Brass Company, type SL, covered with a temperature-resistant heat-shrinkable tube 18 of a plastic material such as the product manufactured by DuPont under the name Teflon (polytetraflouroethylene).

The probes P1 and P2 are joined to timing computer C through coupling devices 20 constructed according to the present invention. As will be explained below, the use of coupling device 20 enables good electrical contact to be maintained between the temperature-sensing element T and the timing computer C, yet permits automatic decoupling of the probes without breakage.

Figure 2:
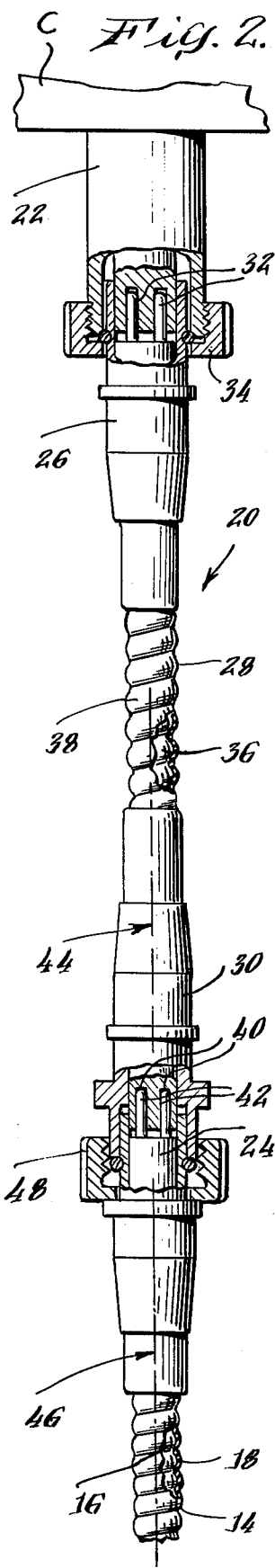
FIG. 2 is an elevational view, partly in section and with enlarged scale, of the probe safety coupling device of the present invention.

Referring now to FIG. 2, the coupling device 20 is arranged to fit between a socket connector 22 attached to computer C and a pin connector 24 attached to the flexible conduit 14 of the probe assembly. The socket and pin connectors 22 and 24 are of the type heretofore conventionally used to attach a probe to a timing computer, wherein the socket and pin connector elements 22 and 24 are mechanically secured together to maintain alignment and good electrical contact, such as the connector manufactured by Amphenol, type 80MCZM. The coupling device 20, as shown in FIG. 2, comprises a first electrical connector 26 joining with connector 22, a central flexible conduit 28, and a second electrical connector 30 joining with probe connector 24.

The first electrical connector 26 is a pin connector preferably the same as pin connector 24 and having pins 32 received by socket connector 22 and an internally threaded captive knurled ring 34 engaging with threads on the exterior of socket connector 22 to fixedly secure connectors 22 and 26 together.

The flexible conduit 28 of coupling device 20 preferably is constructed similarly to the flexible conduit 14 of the probe assembly, with a flexible stainless steel spiral cable 36 and heat-shrinkable tube 38 similar to cable 16 and tube 18.

The second electrical connector 30 in coupling device 20 is a socket connector designed to mate electrically with the probe pin connector 24, having sockets 40 for receiving the pins 42 of connector 24. As shown in FIG. 2, the electrical connector 30 joins the flexible conduit 28 of coupling device 20 to the flexible conduit 14 of the probe so that their respective longitudinal axes 44 and 46 are in alignment. Moreover, the sockets 40 of connector 30 and the pins 42 of connector 44 extend parallel to the axes 44 and 46. In addition, although pin connector 24 has a threaded connecting ring 48 similar to ring 34, the socket connector 30 has no external threads to engage the ring, and consequently the coupling connector 40 remains axially separable from probe connector 24 upon the imposition of axial stress.

Figure 3:
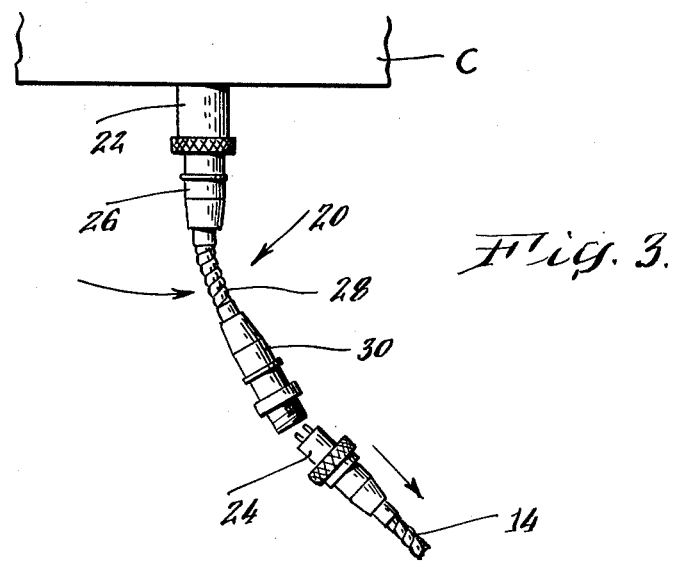
FIG. 3 is an elevational view illustrating the invention during decoupling.

In use, the coupling device 20 provides several advantages. First, even though connectors 30 and 24 are not mechanically fixed together, they maintain good electrical contact because flexible conduits 28 and 14 permit them to remain in axial alignment by absorbing any bending stresses imposed upon the assembly. Second, accidental breakage is minimized when the probe is moved relatively to the timing computer. As shown in FIG. 3, whenever the probe is moved, the flexible conduits 14 and 28 convert the resulting stresses into axial tensive stresses which cause the pins 42 of connector 24 to decouple from the sockets 40 of connector 30 without breakage or harm. Once decoupled, the stresses are relieved. Recoupling of the disconnected probe assembly also is facilitated, since flexible portions 14 and 28 make it easy to align connectors 24 and 30 for insertion of pins 42 into sockets 40.

Further advantages of coupling device 20 are that it uses conventional connector elements, and may be supplied as an add-on item compatible with existing equipment. Construction of coupling device 20 may be accomplished simply by removing the threads from a standard socket connector to form connector 30, and then assembling connector 30 with a standard pin type connector 26 at opposite ends of a length of flexible conduit 18, with electrical connections being made conventionally. Accordingly, probe breakage losses may be avoided with an economical piece of equipment which maintains good electrical characteristics and thus conveys accurate temperature data to the cooking timing computer C.

Although a specific embodiment of the invention has been disclosed herein in detail, it is to be understood that this is for the purpose of illustrating the invention and should not be construed as necessarily limiting the scope of the invention, since it is apparent that many changes can be made to the disclosed structures by those skilled in the art to suit particular applications.

I claim:

1. In a cooking system wherein the cooking is to be controlled by an electrical control unit, such as a timing computer, responsive to a temperature sensed by a probe assembly containing a temperature-sensitive element delivering electrical signals to the timing computer through a flexible conduit, the improvement which comprises:

a probe safety coupling device for electrically and mechanically coupling the probe assembly to said control unit, the probe safety coupling device including:
a first electrical connector fixedly secured to the computer,
a flexible conduit joined to the first electrical connector, and
a second electrical connector axially releasably joining the flexible conduit of the probe assembly to the flexible conduit of the coupling device with their longitudinal axes in alignment, and arranged to release upon the imposition of axial tension, whereby bending strain upon the second electrical connector is reduced to thereby improve electrical contact, and whereby relative movement between said probe assembly and said control unit is converted to an axial stress upon the second electrical connector resulting in separation of the coupling device from the probe assembly without breakage.

2. A cooking system as claimed in claim 1 wherein the second electrical connector is of the pin and socket type and joins with a mating connector in the probe assembly, the pins and sockets thereof extending in alignment with the longitudinal axes of the flexible conduits.

3. A cooking system as claimed in claim 1 wherein the control unit and probe assembly are provided with pin and socket connectors of a type designed to mate with one another, and wherein the probe safety coupling device has its first and second electrical connectors mating with the computer and probe connectors.

4. A cooking system as claimed in claim 3 wherein the first electrical connector of the coupling device is mechanically secured to the control unit connector by means of a threaded ring, the probe connector has a similar threaded ring, and wherein the second electrical connector of the coupling device has a smooth surface in the region adjacent the threaded ring of the probe connector.

5. A cooking probe safety coupling device for electrically and mechanically coupling a flexible probe to an electrical control unit, such as a timing computer, but being self-releasable upon application of axial forces thereto, comprising:
 a flexible conduit fixedly secured to the control unit; and
 an electrical connector joining the probe to the flexible conduit in frictional engagement and being axially releasable from the probe upon the imposition of tensioning strain between the probe and coupling device, whereby relative movement between said probe and said control unit will separate same before damage occurs.

6. A probe safety coupling device as claimed in claim 5 wherein the electrical connector is of the pin and socket type with the pins and sockets extending along the longitudinal axis of the flexible conduit.

7. A probe safety coupling device as claimed in claim 5 further comprising electrical connection means for fixedly securing the flexible conduit to the timing computer.

8. A probe safety coupling device as claimed in claim 5 wherein the flexible conduit comprises a spiral cable and a heat-shrinkable plastic covering over the cable.

9. A probe safety coupling device as claimed in claim 5 wherein the electrical connector joining the probe to the flexible conduit comprises a pin connector and a mating socket connector and wherein the flexible conduit is secured to the timing computer by means of a second pin connector and second socket connector compatible with the first pin and socket connectors.

* * * * *